United States Patent
Wiederkehr et al.

(10) Patent No.: US 7,178,551 B2
(45) Date of Patent: Feb. 20, 2007

(54) VALVE

(76) Inventors: Hans Wiederkehr, Neuhofstrasse 25, CH-8315 Lindau (CH); Kurt Wiederkehr, Neuhofstrasse 25, CH-8315 Lindau (CH)

( * ) Notice: Subject to any disclaimer, the term of this patent is extended or adjusted under 35 U.S.C. 154(b) by 202 days.

(21) Appl. No.: 10/472,373

(22) PCT Filed: Mar. 18, 2002

(86) PCT No.: PCT/EP02/02969

§ 371 (c)(1),
(2), (4) Date: Apr. 1, 2004

(87) PCT Pub. No.: WO02/075186

PCT Pub. Date: Sep. 26, 2002

(65) Prior Publication Data
US 2004/0149336 A1 Aug. 5, 2004

(30) Foreign Application Priority Data
Mar. 17, 2001 (DE) .............................. 101 12 962

(51) Int. Cl.
*G05D 16/10* (2006.01)

(52) U.S. Cl. .......................... 137/505.18; 137/505.25; 137/505.42; 251/144

(58) Field of Classification Search ........... 137/505.18, 137/505.25, 505.42, 116.5, 507; 251/144
See application file for complete search history.

(56) References Cited

U.S. PATENT DOCUMENTS

| 5,234,026 A | * | 8/1993 | Patterson ................ | 137/505.18 |
| 5,890,512 A | * | 4/1999 | Gotthelf et al. ......... | 137/505.42 |
| 5,957,119 A | * | 9/1999 | Perry et al. ............. | 137/505.42 |
| 6,041,762 A | * | 3/2000 | Sirosh et al. ........... | 137/505.25 |

* cited by examiner

Primary Examiner—Stephen M. Hepperle
(74) Attorney, Agent, or Firm—Bachman & LaPointe, P.C.

(57) ABSTRACT

A valve for fitting to a container, in particular a bottle, in which a pressure has accrued, comprising a valve housing in which at least one valve seat is provided. A valve seat, independent of the bottle pressure is located between a piston and the bottle contents and connected to the piston, whereby the other side of the piston is pressurized by an energy store, the force of which is adjustable.

16 Claims, 1 Drawing Sheet

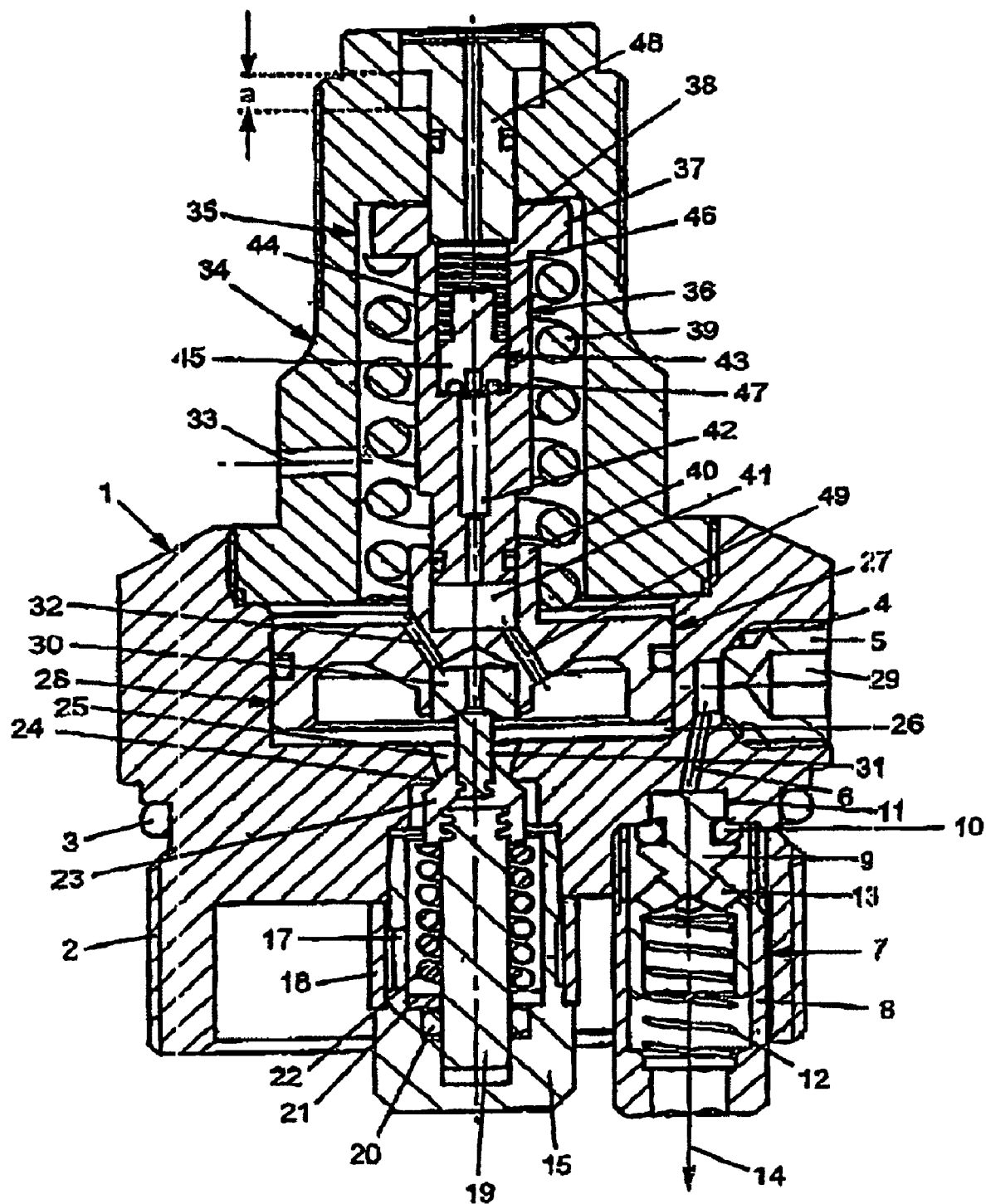

VALVE

BACKGROUND OF THE INVENTION

The present invention relates to a valve for placing onto a container, in particular onto a cylinder in which a pressure is built up, having a valve housing in which at least one valve seat is provided, the valve which is independent of the cylinder pressure being situated between a piston, which slides in a cylinder space and the valve housing, and the cylinder contents connected to the piston, and on the other side a force accumulator which can be changed in its force pressing on the piston.

In many situations in the private and industrial sector, pressure cylinders of steel or aluminum are used which are filled with gases for a certain requirement. In the cylinder, these gases are under a gas pressure of, for example, up to 300 bar.

As an example, reference is made to the use of these cylinders in the drinks industry. For many drinks, a $CO_2$ cylinder is used for adding $CO_2$ to the drink.

A further considerable use is found in the packaging of drinks, in the form of protection of the bottled drink until it is consumed. The addition of a compressed gas prevents the growth of microorganisms.

The same is also true for medical gases, for example for the additional supplying of a person with oxygen. In this case too, the oxygen is supplied in gas cylinders under very high pressure. However, the gas must be at a considerably lower pressure in the inhalation apparatus.

Since the gas in the cylinders, as mentioned above, is under a very high pressure, up to now expensive reducing systems with flow meters and manometers have been required for the removal of the gas.

For example, U.S. Pat. No. 5,520,214 A discloses a valve for supplying oxygen to a patient, in which a filling valve and a regulated extraction valve are situated in a valve body. In this case, a piston, which is supported against a helical spring, the pressure of which can be set, is mounted in a floating manner in a cylinder space. On the other side, the piston is connected fixedly to the ball of a ball valve. The oxygen which is to be discharged from the cylinder builds up in front of this ball valve.

U.S. Pat. No. 4,815,692 discloses a valve, in which a piston, which is connected fixedly to a valve cone, is arranged in a cylinder space in a manner such that it can move counter to the force of disk springs. In this case, the space on the other side of the disk springs can be placed under pressure, so that the valve cone lifts from its seat and opens up an outlet for a medium which is to be discharged.

A valve of the above-mentioned type is disclosed in DE 10 84 215 B. In this case, a piston which is supported against a changeable force of a helical spring is pressed via a spindle pin against a pin via which, in turn, a valve cone can be lifted from its valve seat. If the pressure of the medium flowing into a cylinder space is too high, the piston is pushed back against the adjustable spring and at the same time the opening width of the valve seat is reduced.

The present invention is based on the object of developing a pressure-reducing valve which is of extremely simple construction and can be operated very reliably even without specialist knowledge.

SUMMARY OF THE INVENTION

The object is achieved wherein a safety valve for relieving a piston space formed between the valve and the piston is provided on the piston.

As an exemplary embodiment, it is proposed that the valve cone is not connected fixedly to the piston, but rather is connected via a further ram to a thrust-transmitting component in the piston, the thrust-transmitting component being able to slide in the piston. In this case, the thrust-transmitting component closes an oblique hole which is connected in turn to a relief hole in the valve housing or to a spring housing.

If, for example, the valve seat becomes leaky, compressed gas flows out through the valve seat and builds up an increased pressure in the piston space below the piston. This pressure acts counter to the force accumulator which presses on the piston. This causes the piston to be displaced, but the valve cone remains fixed in position. The displacement has the effect of lifting the thrust-transmitting component from the oblique hole and opening up the latter. This leaked gas can then escape through the relief hole.

The piston is guided in a cylinder space in the valve housing. It is mounted there in a floating manner, as it were, specifically between the pressure accumulator, which acts upon it itself, and the pressure accumulator which presses on the valve cone.

Owing to the fact that the valve seat is independent of the cylinder pressure, what the pressure in the cylinder is has no significance. The valve is only opened if the piston, by being connected to a valve cone of the valve, lifts this valve cone from the seat and thus permits the passage of compressed gas. However, the lifting of the valve cone is undertaken by the force accumulator which presses on the piston, and so it is only this force which is decisive for the lifting of the valve cone. This enables the desired quantity of compressed gas to be set precisely.

The valve seat is formed by the valve cone which has just been mentioned and which sits in a hole opening of the valve housing. The valve cone is preferably beveled, as is the edge of the hole opening, so that the valve cone has extensive contact with the hole opening here.

The valve cone is preferably situated in a guide housing which is inserted into the valve housing. The valve cone is supported against a force accumulator in this guide housing. A helical spring is preferably used as the force accumulator. This means that the valve cone is, firstly, held in the closed position under the pressure of the force accumulator which has just been mentioned, but, secondly, is opposed by the pressure of the above-mentioned force accumulator, which is transmitted via the piston to the valve cone.

The valve cone furthermore sits on a ram which is encompassed by the helical spring which has just been mentioned, and which is situated in the guide housing and can slide in this guide housing. In this case, the valve cone is surrounded on the other side of the valve seat by an O-ring which preferably has the same diameter as the valve seat. This compensates for the force which is caused to act on the valve seat by the supply pressure.

Openings through which the gas can flow from the interior of the cylinder into the interior of the guide housing are provided in the guide housing itself. So that no impurities are entrained here, the openings are surrounded by a filter ring, this preferably being a high-pressure sintering filter.

The cylinder space is to be closed by a spring housing. This spring housing has a stepped hole in which, in particular, the force accumulator which can be changed in its force is held. In this case, this force accumulator, which is designed as a helical spring, encompasses an intermediate component, the force accumulator being supported at one end against the head of the intermediate component and at the other end against the piston.

An actuating pin with which the force accumulator can be prestressed as desired, i.e. the pressure of the force accumulator can be increased, is inserted into the head of the intermediate component. At the same time, the actuating pin closes a valve space in the intermediate component, in which a nonreturn valve is situated. Downstream of the nonreturn valve there is a connection to any desired apparatus which requires the compressed gas, which is reduced in its pressure.

This nonreturn valve comprises a nonreturn-valve cone which is under the pressure of a compression spring in the valve space and closes a hole in the intermediate component. This hole is connected via an annular space in the piston and a stepped hole through the piston to the piston supply space.

During normal removal of the compressed gas, the latter passes via the openings in the guide housing and the valve seat, with the valve cone lifted, into the piston supply space and places the latter under pressure. If the pressure is too high, the piston is displaced counter to the force of its force accumulator which acts upon it, the valve cone following under the pressure of its force accumulator and reducing the passage on the valve seat until the regulating system is balanced.

The compressed gas then passes via the oblique hole, the annular space, the hole in the intermediate component and the nonreturn valve to the consumer If the pressure is to be increased, the pressure of the force accumulator which acts upon the piston is simply increased.

In the preferred exemplary embodiment, a filling valve is also provided in the valve housing for the compressed-gas cylinder, said filling valve also being assigned a nonreturn valve.

A valve of this type can be used wherever certain, precisely set gas pressures are required. This is necessary in the drinks industry, but also for divers or in medical use.

Reference is made to the use of medical oxygen just by way of example. The air inhaled by a person contains about 19% atmospheric oxygen and therefore meets the requirements of the human body for oxygen. In the case, for example, of diseases of the airways, it may be necessary to enrich the inhaled air to a higher content of oxygen. The present, novel valve technology meets all of the requirements of the patients for obtaining oxygen, without limiting performance, up to higher flow rates of 0 to 20 l/min. The cylinder valve supplies oxygen under a constant pressure and flow; it has a safety valve and a re-filling valve and also a fitted particle filter. The safety valve ensures the supply of a predetermined maximum pressure of 2, 4, 6, 8 to 20 bar, depending on the manner of use, even if the cylinder pressure is around 300 bar, without a regulating element having to be actuated.

Gas cylinders equipped in such a manner can make it possible to change over to oxygen in private households, which previously had a $CO_2$ bubbler, without having to interchange the corresponding apparatuses.

BRIEF DESCRIPTION OF THE DRAWINGS

Further advantages, features and details of the invention emerge from the following description of preferred exemplary embodiments and with reference to the drawing wherein the single FIGURE shows a longitudinal section through a valve according to the invention for placing onto a container.

DETAILED DESCRIPTION

The valve R according to the invention has a valve housing 1 which can be screwed, for example, via an external thread 2 into a cylinder neck. An O-ring 3 is provided for sealing it off from the cylinder neck (not shown).

A device for filling the container is situated in the valve housing 1. This device has a filling connection 4 which is closed by a stopper 5. From the filling connection 4 a channel 6 leads to a nonreturn valve 7. This nonreturn valve 7 has a housing 8 which is screwed into the valve housing 1. A valve body 9, in which an O-ring 10 is provided, fits in the housing 8. The O-ring 10 forms a valve seat together with an edge of a recess 11, the recess 11 being connected to the channel 6.

On the other side of the O-ring 10, the valve body 9 is supported against a helical spring 12 which presses the O-ring 10 onto the edge of the recess 11 and thus brings about the valve seat.

The valve body 9 furthermore has holes 13 through which the filling medium can flow into the cylinder (not shown specifically), as indicated by the arrow 14.

Next to the nonreturn valve 7 there is a guide housing 15 which is likewise inserted into the valve housing 1. This guide housing 15 has a stepped recess 16 which has openings 17 to the interior of the cylinder. These openings 17 are covered by a filter ring 18.

A ram 19 which is surrounded by an O-ring 20 is situated in the stepped recess 16. A ring 21 against which a helical spring 22 is supported rests on the O-ring 20.

On the other side, the helical spring 22 engages below a valve cone 23 which sits in a hole opening 24 of a conical hole 25. This conical hole 25 is connected to a piston space 26 in a cylinder space 27. A piston 28, circumferentially supported by an O-ring 29, slides in the cylinder space 27.

A thrust-transmitting component 30, which is connected via a ram 31 to the valve cone 23, protrudes into the piston 28 from the valve cone 23. This thrust-transmitting component 30 closes an oblique hole 32 which can communicate with a relief hole 33. The relief hole 33 is situated in a spring housing 34 which is screwed into the valve housing 1 and closes off the cylinder space 27.

A stepped hole 35 through which the spring housing 34 passes axially is provided in the spring housing 34. The oblique hole 32 can communicate with the relief hole 33 through this stepped hole 35.

An intermediate component 36 which bears with a head 37 of an inner shoulder 38 of the stepped hole 35 is situated in the stepped hole 35. On the other side of the inner shoulder 38, there is placed below the head 37 a helical spring 39 which encompasses the intermediate component 36 and is supported on the other side against the piston 28. In this case, the helical spring 39 also encompasses an annular wall 40 which protrudes from the piston 28 and forms an annular space 41.

The intermediate component 36 slides in the annular space 41, an axial hole 42 leading from the annular space 41 to a nonreturn valve 43. For this purpose, a nonreturn-valve cone 45 which is supported against a compression spring 46 is situated in a valve space 44. Opposite the axial hole 42, an end surface of the nonreturn-valve cone 45 is occupied by an O-ring 47.

The valve space 44 is upwardly closed by an actuating pin 48 which likewise slides in the stepped hole 35.

The annular space 41 is moreover connected to the piston space 26 by a further oblique hole 49.

The manner of operation of the present valve according to the invention is as follows:

In the normal state, a cylinder is filled via the filling connection 4 and the nonreturn valve 7 with a medium which is under a predetermined pressure in the cylinder. A back pressure which is predetermined via the helical spring 39 and the maximum travel a of the compression pin 48 is to be output constantly over the entire range of the cylinder pressure.

The valve cone 23 is under the pressure of the helical spring 22, with the result that the cylinder pressure does not have an effect here and the regulating system is stable in terms of back pressure. In this case, the O-ring 20 is the same size as the valve seat 24/23, with the result that the force which acts on the valve seat due to the supply pressure is compensated for.

If the pressure is to be decreased, the actuating pin 48 is actuated and the travel a reduced. The actuating pin 48 presses on the intermediate component 36 and stresses the helical spring 39 which acts on the piston 28. The piston 28 presses on the valve cone 23 via the thrust-transmitting component 30 and the ram 31, so that gas can flow through the openings 17 via the valve seat 23/24 and the hole 25 into the piston space 26. This takes place until sufficient pressure has built up under the piston 28, this pressure acting counter to the force of the prestressed spring 39 and, as a result, the opening on the valve seat 23/24 is reduced in size.

The gas flows on through the oblique hole 49 into the annular space 41 and from there through the nonreturn valve 43 into a connected apparatus (not shown specifically). This causes the pressure on the piston 28 to slacken off again, so that the force of the helical spring 39 predominates again and the valve seat 23/24 is opened again. As a result, the regulating system is balanced.

In the present case, the safety valve seat which is formed by the thrust-transmitting component 30 and the oblique hole 32 is also of importance. If, for example, the valve cone 23 and/or the valve seat 23/24 become leaky, the gas flows under the piston 28 which is moved against the helical spring 39. As a result, the closure of the oblique hole 32 is lifted by the thrust-transmitting component 30, so that leaked gas can flow through the oblique hole 32 into the stepped hole 35 of the spring housing 34 and via the relief hole 33 to the outside.

The invention claimed is:

1. A valve for placing onto a container in which a pressure is built up, comprising a valve housing (1) having at least one valve seat (23, 24), wherein the valve seat (23, 24) is situated between a piston (28) and the container and is connected to one side of the piston (28), and a force accumulator (39) which can be changed in its force pressing on the piston (28) on the other side, wherein the valve seat is formed by a valve cone (23) which sits in a hole opening (24) of the valve housing (1), the valve cone (23) is connected to a thrust-transmitting component (30) which slides in the piston (28) and the thrust-transmitting component (30) closes an oblique hole (32) which is connected to a relief hole (33) in the valve housing (1) or to a spring housing (34).

2. The valve as claimed in claim 1, wherein the valve cone (23) is supported against a force accumulator (22) in a guide housing (15) which is inserted into the valve housing (1).

3. The valve as claimed in claim 2, wherein the valve cone (23) is placed on a ram (19) which is surrounded by a helical spring (22) as the force accumulator and which slides in an O-ring (20) which has the same inside diameter as the hole opening (24).

4. The valve as claimed in claim 3, wherein the guide housing (15) has at least one opening (17) to the interior of the cylinder.

5. The valve as claimed in claim 4, wherein the opening (17) is covered by a filter (18).

6. The valve as claimed in claim 1, wherein the piston (28) slides in a cylinder space (27) in the valve housing (1).

7. The valve as claimed in claim 6, wherein the cylinder space (27) is closed by the spring housing (34).

8. The valve as claimed in claim 7, wherein the spring housing (34) has an axial stepped hole (35) in which, in particular, the force accumulator (39) which can be changed in its force is held.

9. The valve as claimed in claim 8, wherein the force accumulator (39), as a helical spring, encompasses an intermediate component (36) and is supported at one end against a head (37) of the intermediate component (36) and at the other end against the piston (28).

10. The valve as claimed in claim 8, wherein an actuating pin (48) is inserted into the head (37) of the intermediate component (36).

11. The valve as claimed in claim 10, wherein the actuating pin (48) encloses, in the intermediate component (36), a valve space (44) in which a nonreturn valve (45, 46) is situated.

12. The valve as claimed in claim 11, wherein a compression spring (46) is supported in the valve space (44) against a nonreturn-valve cone (45) which closes a hole (42) in the intermediate component (36).

13. The valve as claimed in claim 12, wherein the intermediate component (36) slides in a sealed manner in an annular space (41) which is formed by an annular wall (40) protruding from the piston (28).

14. The valve as claimed in claim 13, wherein the hole (42) leads from the nonreturn valve into the annular space (41) and also into an oblique hole (49) which connects the annular space (41) to a piston space (26) into which the hole (25), which forms the valve seat (24) with the valve cone (23), also leads.

15. The valve as claimed in claim 14, wherein a filling valve is also provided in the valve housing (1).

16. The valve as claimed in claim 15, wherein the filling valve is designed as a nonreturn valve (7).

* * * * *